June 2, 1964                J. BLOCH                3,135,383
UTENSIL TRAY WITH KNIFE SHARPENING MEANS
Filed June 18, 1962                                2 Sheets-Sheet 1
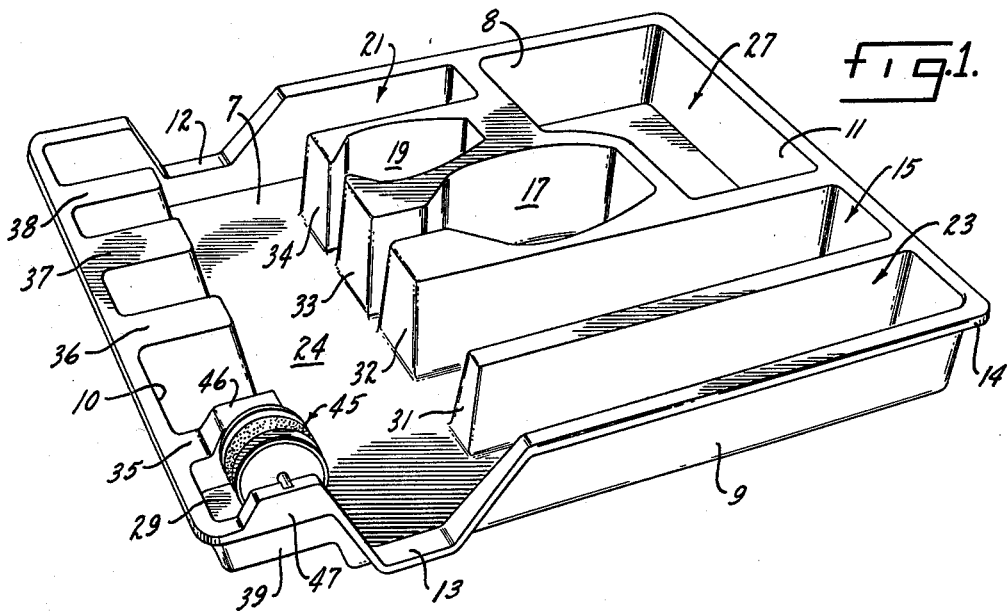
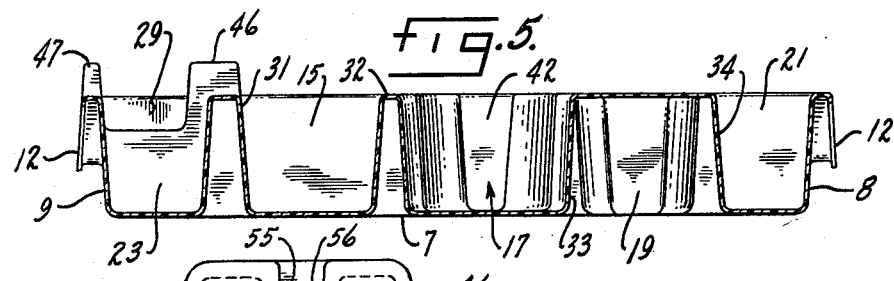
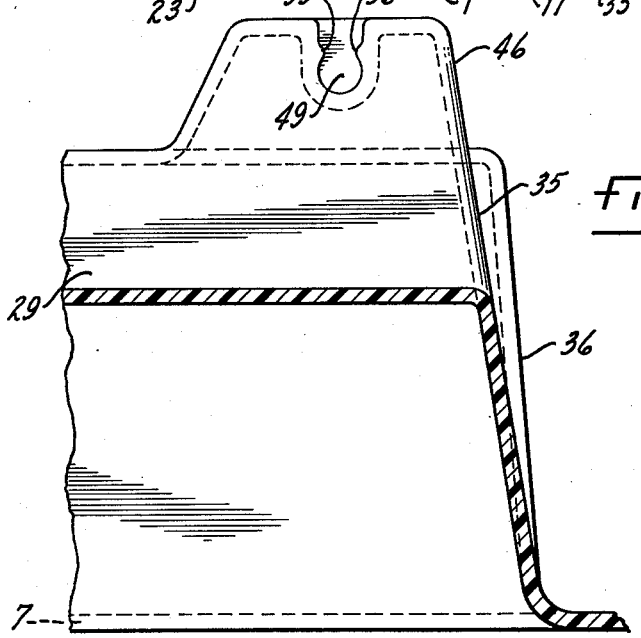
INVENTOR.
Jack Bloch,
BY Parker & Carter
Attorneys.

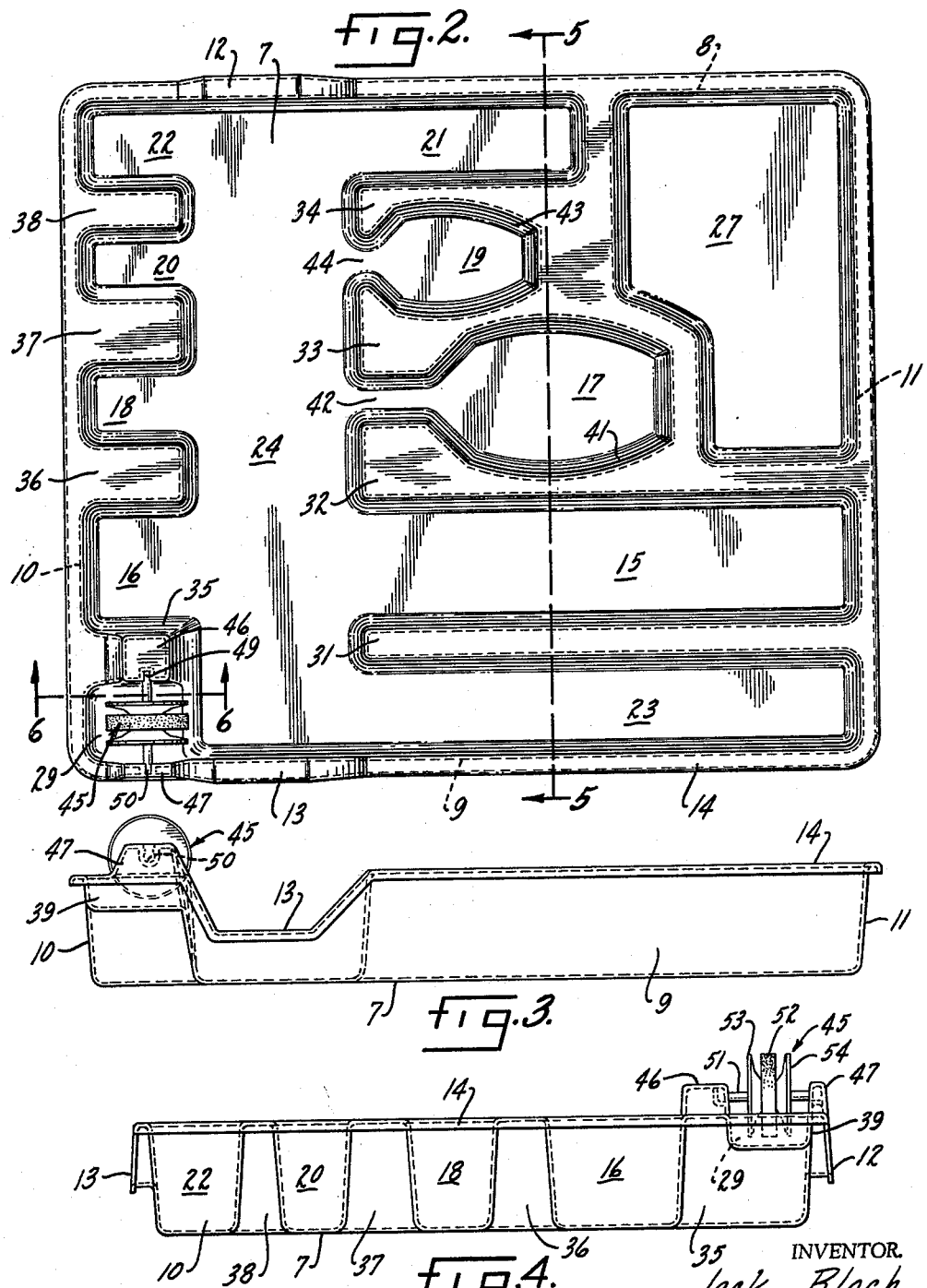

United States Patent Office 3,135,383
Patented June 2, 1964

3,135,383
UTENSIL TRAY WITH KNIFE SHARPENING MEANS
Jack Bloch, Fort Worth, Tex., assignor to Loma Industries, Fort Worth, Tex., a corporation of Texas
Filed June 18, 1962, Ser. No. 203,029
3 Claims. (Cl. 206—75)

This invention relates to a utensil tray, in particular, a molded plastic tray to hold the usual kitchen utensils.

A primary object of this invention is a compact and versatile plastic utensil tray which may be economically molded from one piece.

Another object is a utensil tray which allows easy manual access for depositing and withdrawing kitchen utensils.

Another object is a utensil tray adapted to removably hold a knife sharpener.

Another object is a utensil tray having multiple compartments which are designed to conveniently receive and hold kitchen utensils.

Another object is a utensil tray having generally aligned compartments divided in two parts by a transverse channel to allow manual access via the channel for depositing and withdrawing utensils from the compartments.

Another object is a utensil tray having generally aligned compartments of different length to accommodate cutlery and utensils of different length.

Another object is a utensil tray having aligned cutlery compartments divided in two parts by a transverse channel in combination with modified means on one of the divided compartments to releasably hold a knife sharpener.

Another object is a utensil tray having generally aligned compartments divided by a transverse channel in combination with specially modified walls in some of the compartments to conform to the configuration of utensils such as spoons and forks.

Another object is a utensil tray having generally aligned compartments divided in two parts by a transverse channel wherein some of the compartments have modified side walls conformed to the general outline of the utensils and constricted to snugly hold handle portions of said utensils.

The foregoing objects are accomplished along with other objects which will be apparent from this disclosure by the invention which is described in detail and which is illustrated in the accompanying drawings wherein:

FIGURE 1 is a perspective view of the utensil tray,
FIGURE 2 is a top plan view of the tray,
FIGURE 3 is a side elevation view of the tray,
FIGURE 4 is a front elevation view of the tray,
FIGURE 5 is a sectional view along line 5—5 of FIGURE 2, and
FIGURE 6 is a sectional view along line 6—6 of FIGURE 2.

The same reference numerals in the various views of the drawings will, of course, refer to the same structures and concepts.

The utensil tray shown here is molded from plastic, preferably in one piece. The perspective view of the tray in FIGURE 1 shows the tray to be generally in the shape of an open top box having opposed side walls 8, 9 joined by opposed end walls 10, 11. The side walls are shown with lowered portions 12 and 13. The end walls are interrupted by depressions which set apart the various compartments, as will be further discussed and shown in the front view of FIGURE 4. A curved lip 14 may be formed at the top edge of the end walls and the side walls as shown. A floor portion 7 is also shown extending to the various walls. The floor portion is interrupted by depressions in a manner similar to that of the end walls.

A plurality of aligned compartments are shown divided in two parts by a transverse channel 24 which is shown extending from side wall 8 to side wall 9. The transverse channel 24 may be considered as formed from common interrupted portions dividing the various compartments into a larger part such as 15 and a smaller part 16. Similarly aligned larger and smaller parts 17 and 18, 19 and 20, 21 and 22 are shown, as well as an undivided compartment 23. Parts 17, 19 and 21 terminate short of end wall 11 to define an angular compartment 27 therebetween. The transverse channel 24 is shown separating the cutlery compartment 29 which will be later described. The larger parts of the compartments are separated or defined by compartment walls 31, 32, 33 and 34. The smaller parts are separated or defined by compartment walls 35, 36, 37 and 38.

It is seen that the compartment walls 32, 33 of larger part 17 are modified into a generally elliptical shape 41 to conform to the general outline of a large spoon. The compartment walls 32, 33 are also shown constricted as at 42 to provide a narrow passageway in which the handle of a spoon may snugly rest. The compartment walls 33, 34 of larger part 19 are also modified into a generally elliptical shape 43 and have a constricted portion 44 to similarly receive a utensil, such as a smaller spoon, in a snug fit. The adjoining relationship of the larger parts 17 and 19 and constricted portion 42 may be further seen in FIGURE 5.

Elevated compartment 29 is shown as holding a knife sharpener generally shown as 45. Compartment 29 may be formed in part by a shortened portion 39 of side wall 9 opposed to compartment wall 35. Wall 35 has a trunnion portion 46 with recess 49, and opposed wall 39 has a trunnion portion 47 with recess 50. The recesses are adapted to journal by friction fit the ends of shaft 51 on which is mounted an annular knife sharpener 45. Small snap projections or rises such as 55 and 56 shown in recess 49 may be used to snap fit the ends of shaft 51 (FIGURE 6). Recess 50 may be similarly provided with snap rises. The knife sharpener 45 shown here has an annular cutting stone 52 spaced by annular knife guide members 53 and 54.

The utensil tray has been said to be preferably molded in one piece from plastic and, accordingly, it is understood that the various compartments will be formed by appropriate dies which form components in various lengths, which also modify the compartments into particular shapes, and which dimension the width of compartment walls to particular standards. One piece molding will result in a utensil tray wherein the plastic is convoluted and formed to define the foregoing particular compartments. The front view of FIGURE 4 and the section view of FIGURE 5 indicate the convoluted pattern of the utensil tray.

A suitable plastic for molding the trays has been found to be low density polyethylene but it is apparent that a wide variety of rigid and preferably semi-rigid plastics may be used. This will include various acrylic resins, polyester resins, reinforced plastics such as fiberglass and polyester resin, epoxy resin and all the various fillers, extenders and the like which are well known in the plastic art.

The use and operation of my invention are as follows:

The plastic molded tray disclosed herein combines a number of advantages. A plurality of generally aligned utensil compartments are provided which are divided in two parts by a transverse channel 24. The presence of the channel in combination with the compartments permits easy manual access to the various compartments for depositing and removing utensils. The compartments are further dimensioned to hold utensils of various configurations. Thus, there is shown a cutlery compartment 23, another cutlery compartment 15, 16 to hold longer knives, a large spoon compartment 17, 18, a smaller spoon compartment 19, 20 and a compartment 21, 22 which may be used for forks. A compartment 27 may be additionally provided as shown to advantageously utilize a non-used portion of the tray to suitably receive small and miscellaneous kitchen utensils such as caps, openers, prongs, and the like.

The spoon compartments 17, 18 and 19, 20 are advantageously modified to receive and hold spoons which may be stacked neatly within the compartments. The constriction or narrow passageways 42 and 44 in the spoon compartments are adapted to hold the handle portions snugly and neatly, one upon the other. Similar constrictions may be placed in other compartments if desired as, for example, the compartment 21, 22 which may be reserved for forks.

With the utensil tray disclosed herein, it is seen that utensils can be deposited and removed easily because the transverse channel allows easy manual entry and removal. Also, the various compartments are dimensioned not only to hold separate utensils but to hold them neatly and snugly.

An advantage of high importance is the presence of the knife sharpener 45 removably held on the trunnion walls 46 and 47 of compartment 29. It is seen that this sharpener is proximate to the cutlery compartments 23 and 15, 16. A longer knife, for example, may be removed from the cutlery compartment 15, 16 and quickly sharpened on the sharpener 45. The presence of the knife sharpener 45 adjacent the cutlery compartments has the effect of making it extremely simple and convenient to maintain the various pieces of cutlery in a constantly sharp condition. A further advantage is present in that the knife sharpener may be removed and seated on appropriate trunnions elsewhere, as on a working shelf near the utensil tray. In such an event, the compartment may be advantageously used to hold other small kitchen utensils such as corks, safety pins, matches and the like.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A one piece molded utensil tray which includes an open top box having front and end walls, opposed side walls, convolutions extending from the front and end walls which define a plurality of aligned walls with compartments for utensils therebetween, a transverse channel dividing some of the compartments into a longer and a shorter part, a cutlery compartment extending to the back wall, said cutlery compartment next to a side wall, a corner compartment at the junction of the front wall and the side wall next to the cutlery compartment, the corner compartment abutting said cutlery compartment, raised trunnion walls spaced from each other on the corner compartment, a knife sharpener having rotatable abrasive material on a shaft, and the ends of the shaft removably journaled in recesses of the raised trunnion walls whereby the cutlery is specially placed to be sharpened and the corner compartment may be easily opened by removing the knife sharpener.

2. A unitary plastic molded utensil tray as in claim 1 further characterized by and including a general corner compartment formed between the back wall, a side wall, and a plurality of utensil compartments.

3. A one piece molded utensil tray which includes an open top box having front and end walls, opposed side walls, convolutions extending from the front and end walls which define a plurality of aligned walls with compartments for utensils therebetween, a transverse channel dividing the compartments into a longer and shorter part, a cutlery compartment extending to the back wall, said cutlery compartment next to a side wall, some of the longer parts dimensioned and shaped to conform to the size and configurations of particular utensils, a raised corner compartment at the junction of the front wall and the side wall next to the cutlery compartment, the corner compartment abutting said cutlery compartment having raised trunnion walls spaced from each other on the corner comparment, a recess in each trunnion wall, a knife sharpener having rotatable abrasive material on a shaft, the ends of the shaft removably journaled by frictional fit in the recesses of the raised trunnion walls, and at least one more cutlery compartment immediately adjoining the cutlery compartment holding the knife sharpener, whereby the cutlery is positioned to be sharpened and the corner compartment may be easily opened by removing the knife sharpener.

References Cited in the file of this patent

UNITED STATES PATENTS

| | | |
|---|---|---|
| 1,439,711 | Reder | Dec. 26, 1922 |
| 2,228,493 | Will | Jan. 14, 1941 |
| 2,475,937 | Alexander | July 12, 1949 |
| 2,574,099 | Gessler | Nov. 6, 1951 |
| 3,034,264 | McMaster | May 15, 1962 |

FOREIGN PATENTS

| | | |
|---|---|---|
| 837,386 | France | Nov. 12, 1938 |
| 771,335 | Great Britain | Mar. 27, 1957 |